United States Patent
Li et al.

(10) Patent No.: US 10,311,115 B2
(45) Date of Patent: Jun. 4, 2019

(54) OBJECT SEARCH METHOD AND APPARATUS

(71) Applicant: Huawei Technologies Co., Ltd., Shenzhen (CN)

(72) Inventors: Yan Li, Shenzhen (CN); Xiaojuan Li, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 653 days.

(21) Appl. No.: 14/902,227

(22) PCT Filed: May 15, 2014

(86) PCT No.: PCT/CN2014/077566
§ 371 (c)(1),
(2) Date: Dec. 30, 2015

(87) PCT Pub. No.: WO2015/172359
PCT Pub. Date: Nov. 19, 2015

(65) Prior Publication Data
US 2016/0147882 A1 May 26, 2016

(51) Int. Cl.
*G06F 3/01* (2006.01)
*G06F 3/16* (2006.01)
(Continued)

(52) U.S. Cl.
CPC ............ *G06F 16/951* (2019.01); *G06F 3/017* (2013.01); *G06F 3/0482* (2013.01);
(Continued)

(58) Field of Classification Search
CPC ................................................ G06F 17/30864
See application file for complete search history.

(56) References Cited

U.S. PATENT DOCUMENTS 6,513,063 B1 * 1/2003 Julia .................. G06F 9/465
707/E17.071
2007/0067345 A1 3/2007 Li et al.
(Continued)

FOREIGN PATENT DOCUMENTS

CN 1952935 A 4/2007
CN 101071431 A 11/2007
(Continued)

OTHER PUBLICATIONS

Wang, Yang, et al. "JIGSAW: interactive mobile visual search with multimodal queries." Proceedings of the 19th ACM international conference on Multimedia. ACM, 2011. (Year: 2011).*
Wei, Di, et al. "Style finder: fine-grained clothing style recognition and retrieval." Computer Vision and Pattern Recognition Workshops. 2013. (Year: 2013).*
Machine Translation and Abstract of Japanese Publication No. JP2003173432, Jun. 20, 2003, 16 pages.
(Continued)

*Primary Examiner* — William Spieler
(74) *Attorney, Agent, or Firm* — Conley Rose, P.C.

(57) ABSTRACT

An object search method and apparatus, where the method includes receiving voice input and gesture input that are of a user; determining, according to the voice input, a name of a target object for which the user expects to search and a characteristic category of the target object; extracting characteristic information of the characteristic category from an image area selected by the user by means of the gesture input; and searching for the target object according to the extracted characteristic information and the name of the target object. The solutions provided in the embodiments of the present disclosure can provide a user with a more flexible search manner, and reduce a restriction on an application scenario during a search.

20 Claims, 4 Drawing Sheets

(51) Int. Cl.
*G06F 16/50* (2019.01)
*G06F 16/242* (2019.01)
*G06F 16/532* (2019.01)
*G06F 16/951* (2019.01)
*G06F 3/0482* (2013.01)
*G06F 3/0484* (2013.01)
*G06F 3/0488* (2013.01)

(52) U.S. Cl.
CPC ...... *G06F 3/04842* (2013.01); *G06F 3/04883* (2013.01); *G06F 3/167* (2013.01); *G06F 16/2428* (2019.01); *G06F 16/50* (2019.01); *G06F 16/532* (2019.01); *G06F 2203/0381* (2013.01)

(56) References Cited

U.S. PATENT DOCUMENTS

| | | | |
|---|---|---|---|
| 2009/0287626 | A1 | 11/2009 | Paek et al. |
| 2010/0114944 | A1* | 5/2010 | Adler .................. G10L 13/027 707/770 |
| 2010/0281435 | A1 | 11/2010 | Bangalore et al. |
| 2011/0035406 | A1 | 2/2011 | Petrou et al. |
| 2012/0109858 | A1* | 5/2012 | Makadia ........... G06F 17/30026 706/12 |
| 2012/0155717 | A1 | 6/2012 | Ma et al. |
| 2013/0144629 | A1 | 6/2013 | Johnston et al. |

FOREIGN PATENT DOCUMENTS

| | | | |
|---|---|---|---|
| CN | 101216841 | A | 7/2008 |
| CN | 101930457 | A | 12/2010 |
| CN | 102411627 | A | 4/2012 |
| CN | 103020184 | A | 4/2013 |
| CN | 103246682 | A | 8/2013 |
| JP | H08166866 | A | 6/1996 |
| JP | H10198695 | A | 7/1998 |
| JP | 2003173432 | A | 6/2003 |
| JP | 2006107109 | A | 4/2006 |
| JP | 2007026316 | A | 2/2007 |
| JP | 2013045122 | A | 3/2013 |
| WO | 2012058577 | A1 | 5/2012 |
| WO | 2013075316 | A1 | 5/2013 |

OTHER PUBLICATIONS

Machine Translation and Abstract of Japanese Publication No. JP2006107109, Apr. 20, 2006, 23 pages.
Machine Translation and Abstract of Japanese Publication No. JP2007026316, Jan. 2, 2007, 33 pages.
Machine Translation and Abstract of Japanese Publication No. JP2013045122, Mar. 4, 2013, 25 pages.
Machine Translation and Abstract of Japanese Publication No. JPH10198695, Jul. 31, 1998, 20 pages.
Foreign Communication From a Counterpart Application, Japanese Application No. 2016-550858, Japanese Office Action dated Aug. 1, 2017, 4 pages.
Foreign Communication From a Counterpart Application, Japanese Application No. 2016-550858, English Translation of Japanese Office Action dated Aug. 1, 2017, 5 pages.
Partial English Translation and Abstract of Chinese Patent Application No. CN101071431, Nov. 14, 2007, 29 pages.
Partial English Translation and Abstract of Chinese Patent Application No. CN101216841, Jul. 9, 2008, 21 pages.
Partial English Translation and Abstract of Chinese Patent Application No. CN103020184, Apr. 3, 2013, 12 pages.
Partial English Translation and Abstract of Chinese Patent Application No. CN103246682, Aug. 14, 2013, 8 pages.
Foreign Communication From a Counterpart Application, Chinese Application No. 201480003299.4, Chinese Office Action dated Nov. 30, 2016, 7 pages.
Foreign Communication From a Counterpart Application, European Application No. 14892023.4, Extended European Search Report dated Jul. 27, 2016, 9 pages.
Partial English Translation and Abstract of Chinese Patent Application No. CN001952935, Apr. 26, 2016, 5 pages.
Partial English Translation and Abstract of Chinese Patent Application No. CN101930457, Dec. 26, 2015, 8 pages.
Partial English Translation and Abstract of Japanese Patent Application No. JPH08166866, May 9, 2016, 39 pages.
Foreign Communication From a Counterpart Application, PCT Application No. PCT/CN2014/077566, English Translation of International Search Report dated Feb. 17, 2015, 2 pages.
Foreign Communication From a Counterpart Application, PCT Application No. PCT/CN2014/077566, English Translation of Written Opinion dated Feb. 17, 2015, 4 pages.

* cited by examiner

OBJECT SEARCH METHOD AND APPARATUS

CROSS-REFERENCE TO RELATED APPLICATIONS

This application is a National Stage of International Application No. PCT/CN2014/077566, filed on May 15, 2014, which is hereby incorporated by reference in its entirety.

TECHNICAL FIELD

The present disclosure relates to the field of search technologies in the field of computer technologies, and in particular, to an object search method and apparatus.

BACKGROUND

Currently, when searching for a to-be-searched-for target object by using a network, generally, a user inputs or selects some known search criteria for the target object, and then searches for the target object according to the search criteria. For example, searching may be performed according to a price range of the target object, or searching may be performed according to an area to which the target object belongs.

In the foregoing object search solution, a user is required to be able to clearly describe a search criterion on which a search is based. For example, the search criterion may be selected from some preset criteria, or may be directly input. However, in an actual application, when searching for a target object, a user may be unable to clearly describe a search criterion expected by the user. For example, the user expects to search for an object of a particular color, but the color cannot be accurately described using a name of a known color, or the user expects to search for an object of a particular shape, but the shape is not regular. Consequently, in this case, the user cannot search for the target object expected by the user. In addition, even if searching is performed, it is possible that a search result does not meet a search intention of the user because the search criterion is not accurate, thereby leading to a relatively poor search effect. An object search method in the prior art cannot provide the user with a more flexible search manner, and is relatively greatly restricted by an application scenario.

SUMMARY

Embodiments of the present disclosure provide an object search method and apparatus, to resolve a problem in the prior art that a more flexible search manner cannot be provided for a user and a restriction on an application scenario is relatively great.

According to a first aspect, an object search method is provided, including receiving voice input and gesture input that are of a user; determining, according to the voice input, a name of a target object for which the user expects to search and a characteristic category of the target object; extracting characteristic information of the characteristic category from an image area selected by the user by means of the gesture input; and searching for the target object according to the extracted characteristic information and the name of the target object.

With reference to the first aspect, in a first possible implementation manner, the searching for the target object according to the extracted characteristic information and the name of the target object includes sending the characteristic information and the name of the target object to a server; and receiving a search result returned by the server, where the search result is obtained by the server by searching, according to the characteristic information, for the target object represented by the name of the target object.

With reference to the first aspect or the first possible implementation manner of the first aspect, in a second possible implementation manner, the receiving voice input and gesture input that are of a user includes receiving voice input and gesture input that are performed simultaneously by the user; or receiving voice input of the user, and when it is determined that no gesture input is performed by the user and no image area is selected, instructing the user to perform an operation of selecting an image area, and receiving gesture input of the user; or receiving gesture input of the user, and when it is determined that no voice input is performed by the user, instructing the user to perform a voice input operation, and receiving voice input of the user.

With reference to the first aspect or the first possible implementation manner of the first aspect, in a third possible implementation manner, acquiring the image area selected by the user by means of the gesture input includes acquiring an image area that is selected from a designated image by the user by means of the gesture input, and using the image area as the image area selected by the user; or acquiring an image that is obtained by photographing by the user by means of the gesture input, and using the image area as the image area selected by the user.

According to a second aspect, an object search apparatus is provided, including a first receiving unit configured to receive voice input and gesture input that are of a user; a first determining unit configured to determine, according to the voice input, a name of a target object for which the user expects to search and a characteristic category of the target object; an extracting unit configured to extract characteristic information of the characteristic category from an image area selected by the user by means of the gesture input; and a first searching unit configured to search for the target object according to the extracted characteristic information and the name of the target object.

With reference to the second aspect, in a first possible implementation manner, the first searching unit is configured to send the characteristic information and the name of the target object to a server, and receive a search result returned by the server, where the search result is obtained by the server by searching, according to the characteristic information, for the target object represented by the name of the target object.

With reference to the second aspect or the first possible implementation manner of the second aspect, in a second possible implementation manner, the first receiving unit is configured to receive voice input and gesture input that are performed simultaneously by the user; or receive voice input of the user, and when it is determined that no gesture input is performed by the user and no image area is selected, instruct the user to perform an operation of selecting an image area, and receive gesture input of the user; or receive gesture input of the user, and when it is determined that no voice input is performed by the user, instruct the user to perform a voice input operation, and receive voice input of the user.

With reference to the second aspect or the first possible implementation manner of the second aspect, in a third possible implementation manner, the first determining unit is further configured to acquire an image area that is selected from a designated image by the user by means of the gesture input and use the image area as the image area selected by the user; or acquire an image that is obtained by photographing by the user by means of the gesture input and use the image area as the image area selected by the user.

According to a third aspect, an object search method is provided, including receiving voice input and gesture input that are of a user; determining, according to the voice input, a name of a target object for which the user expects to search and a characteristic category of the target object; sending, to a server, category information of the characteristic category, the name of the target object, and an image area that is selected by the user by means of the gesture input; and receiving a search result returned by the server, where the search result is obtained by the server by searching for the target object represented by the name of the target object, where a characteristic of the characteristic category that is of the image area and represented by the category information is used as a search criterion.

With reference to the third aspect, in a first possible implementation manner, the receiving voice input and gesture input that are of a user includes receiving voice input and gesture input that are performed simultaneously by the user; or receiving voice input of the user, and when it is determined that no gesture input is performed by the user and no image area is selected, instructing the user to perform an operation of selecting an image area, and receiving gesture input of the user; or receiving gesture input of the user, and when it is determined that no voice input is performed by the user, instructing the user to perform a voice input operation, and receiving voice input of the user.

With reference to the third aspect, in a second possible implementation manner, acquiring the image area selected by the user by means of the gesture input includes acquiring an image area that is selected from a designated image by the user by means of the gesture input, and using the image area as the image area selected by the user; or acquiring an image that is obtained by photographing by the user by means of the gesture input, and using the image area as the image area selected by the user.

According to a fourth aspect, an object search apparatus is provided, including a second receiving unit configured to receive voice input and gesture input that are of a user; a second determining unit configured to determine, according to the voice input, a name of a target object for which the user expects to search and a characteristic category of the target object; a sending unit configured to send, to a server, category information of the characteristic category, the name of the target object, and an image area that is selected by the user by means of the gesture input; and a third receiving unit configured to receive a search result returned by the server, where the search result is obtained by the server by searching for the target object represented by the name of the target object, where a characteristic of the characteristic category that is of the image area and represented by the category information is used as a search criterion.

With reference to the fourth aspect, in a first possible implementation manner, the second receiving unit is configured to receive voice input and gesture input that are performed simultaneously by the user; or receive voice input of the user, and when it is determined that no gesture input is performed by the user and no image area is selected, instruct the user to perform an operation of selecting an image area, and receive gesture input of the user; or receive gesture input of the user, and when it is determined that no voice input is performed by the user, instruct the user to perform a voice input operation, and receive voice input of the user.

With reference to the fourth aspect, in a second possible implementation manner, the second determining unit is further configured to acquire an image area that is selected from a designated image by the user by means of the gesture input and use the image area as the image area selected by the user; or acquire an image that is obtained by photographing by the user by means of the gesture input and use the image area as the image area selected by the user.

Beneficial effects of the present disclosure include the following. In the foregoing solutions provided in the embodiments of the present disclosure, when object searching is performed, voice input and gesture input that are of a user are first received, a name of a target object for which the user expects to search and a characteristic category of the target object are determined according to the voice input, and the target object is searched for using a characteristic of the characteristic category of an image area selected by the user by means of the gesture input and the name of the target object as search criteria. During searching, the user only needs to input, using a voice, the characteristic category and the name of the target object, and select an image area by means of the gesture input, and the characteristic category, the name of the target object, and the image area can be used to represent search criteria without requiring clear description of the search criteria. Therefore, a more flexible search manner is provided for the user, and a restriction on an application scenario is reduced during searching.

Other characteristics and advantages of this application are discussed in the following specifications, some of which become evident in the specifications, or are understood by implementing this application. Objectives and other advantages may be implemented and obtained using the written specifications, claims, and a structure pointed out in the accompanying drawings.

BRIEF DESCRIPTION OF DRAWINGS

The accompanying drawings are used to facilitate further understanding of the present disclosure, constitute a part of the specifications, and are used in combination with the embodiments of the present disclosure to explain the present disclosure, but do not constitute limitation to the present disclosure. In the accompanying drawings.

DESCRIPTION OF EMBODIMENTS

To put forth an implementation solution that provides a user with a more flexible search manner and reduces a restriction on an application scenario during searching, the embodiments of the present disclosure provide an object search method and apparatus. Preferred embodiments of the present disclosure are described below with reference to the accompanying drawings of the specifications. It should be understood that the preferred embodiments described herein are only used to describe and explain the present disclosure, and do not restrict the present disclosure. In addition, the embodiments of the present disclosure and features of the embodiments can be combined with each other provided that no collision occurs.

Figure 1:
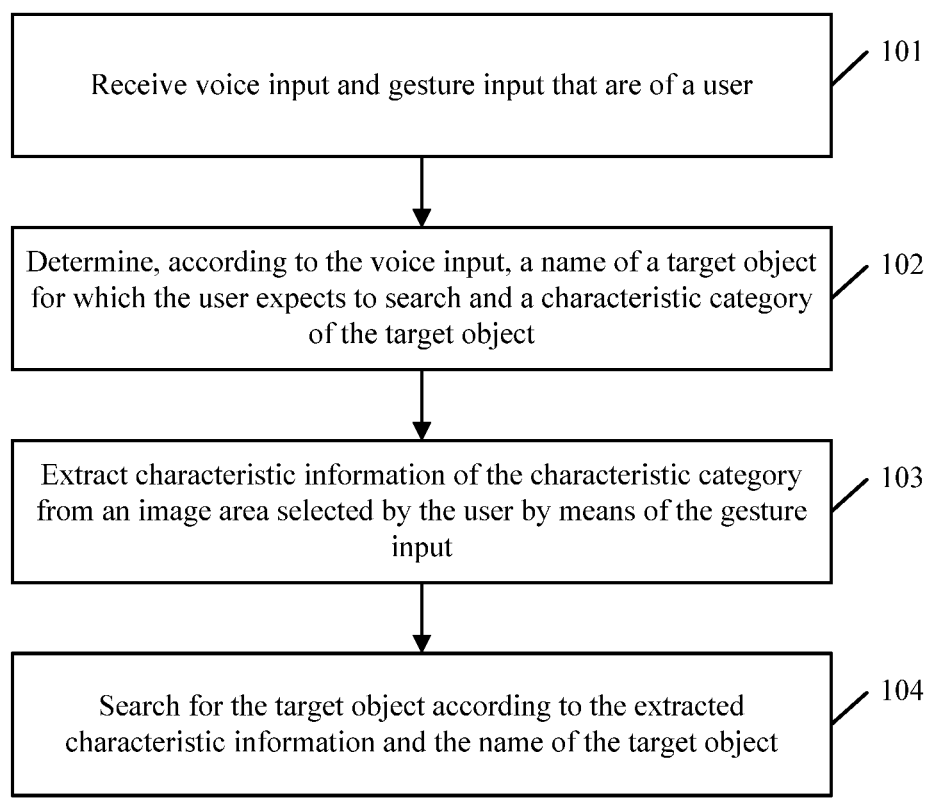
FIG. 1 is Flowchart 1 of an object search method according to an embodiment of the present disclosure.

An embodiment of the present disclosure provides an object search method, which can be applied to a terminal. As shown in FIG. 1, the method includes the following steps.

Step 101. Receive voice input and gesture input that are of a user.

Step 102. Determine, according to the voice input, a name of a target object for which the user expects to search and a characteristic category of the target object.

Step 103. Extract characteristic information of the characteristic category from an image area selected by the user by means of the gesture input.

Step 104. Search for the target object according to the extracted characteristic information and the name of the target object.

In the foregoing method shown in FIG. 1, in step 103, the terminal may directly extract the characteristic information of the characteristic category from the image area selected by the user. When executing step 104, the terminal may search an object set locally stored on the terminal, or may search on the Internet. That is, the characteristic information and the name of the target object are sent to a server, and after the server obtains a search result by searching, according to the characteristic information, for the target object represented by the name of the target object, the search result returned by the server is received, and further, the search result may further be displayed.

Figure 2:
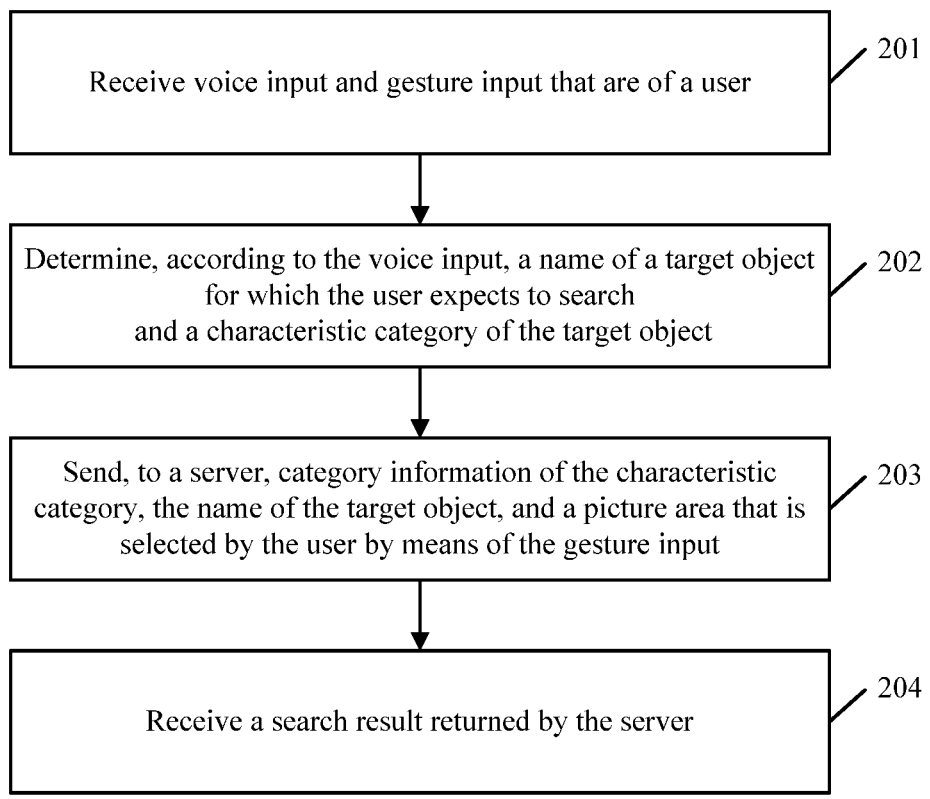
FIG. 2 is Flowchart 2 of an object search method according to an embodiment of the present disclosure.

An embodiment of the present disclosure further provides an object search method, which is different from the foregoing method shown in FIG. 1 and can also be applied to a terminal. As shown in FIG. 2, the method includes the following steps.

Step 201. Receive voice input and gesture input that are of a user.

Step 202. Determine, according to the voice input, a name of a target object for which the user expects to search and a characteristic category of the target object.

Step 203. Send, to a server, category information of the characteristic category, the name of the target object, and an image area that is selected by the user by means of the gesture input.

Step 204. Receive a search result returned by the server, where the search result is obtained by the server by searching for the target object represented by the name of the target object, where a characteristic of the characteristic category that is of the image area and represented by the category information is used as a search criterion.

In the foregoing method shown in FIG. 2, after determining the name of the target object for which the user expects to search and the characteristic category of the target object in step 202, the terminal directly sends, to the server, the category information of the characteristic category, the name of the target object, and the image area selected by the user; and the server performs searching based on these pieces of received information, and returns the search result to the terminal.

In addition, when performing searching, the server may extract the characteristic information of the characteristic category from the received image area selected by the user, and search for the target object according to the extracted characteristic information and the name of the target object.

For the foregoing object search methods shown in FIG. 1 and FIG. 2, step 101 and step 102 are the same as step 201 and step 202 respectively. In addition, in the foregoing step 101 and step 102, and step 201 and step 202, the user may input the characteristic category and the name of the target object in a manner of voice input. For example, the input characteristic category may include a color, a shape, a price, a brand, an image, and the like, and the input name of the target object may be an article name of an article expected to be searched for.

More specifically, the user may input voice information in a manner of voice input, where the voice information carries the characteristic category and the name of the target object. For example, the user inputs, using a voice, "search for a wallet of this color", "search for shoes of this brand", and "search for a phone shell in this image".

When the user inputs the voice information in a manner of voice input, semantic analysis is performed on the voice information input by the user, to determine the characteristic category and the name of the target object. A manner of performing semantic analysis on the voice information to extract text information may use various manners in the prior art, which is not described in detail herein.

In this embodiment of the present disclosure, when performing an operation of selecting an image area, the user may select an image area from a designated image. For example, the user performs, by means of a gesture operation, a selection operation on a touchscreen displaying the designated image, and accordingly, the image area selected by the user from the designated image is acquired and used as the image area selected by the user When performing the operation of selecting an image area, the user may also start a photographing mode, and perform a photographing operation to obtain an image, and accordingly, the current image obtained by photographing by the user is acquired and used as the image area selected by the user.

In this embodiment of the present disclosure, there is no strict order between the operation of selecting the image area by the user and the operation of inputting the characteristic category and the name of the target object.

In addition, the operation of selecting the image area by the user and the operation of inputting the voice information may be completed simultaneously. For example, when inputting the voice information, the user may select the image area using the gesture operation.

The operation of selecting the image area by the user and the operation of inputting the voice information may also be completed one after another. For example, when it is determined that voice information is input by the user but no image area is selected, the user is instructed to perform the operation of selecting an image area; and after the user performs the operation of selecting an image area, the image area selected by the user is determined.

For another example, when it is determined that the user performs a gesture input operation to select the image and no voice information is input, the user is instructed to perform an operation of inputting voice information. After the user inputs the voice information, semantic analysis is performed on the input voice information, to determine the characteristic category and the name of the target object.

In the foregoing methods shown in FIG. 1 and FIG. 2, the characteristic information of the characteristic category may be extracted from the image area selected by the user by means of the gesture input, and the target object represented by the name of the target object may be searched for according to the extracted characteristic information.

For example, if the characteristic category is a color, color characteristic information of the image area selected by the user is extracted. Various types in the prior art may be used to represent the color characteristic information. For example, a color histogram (a color histogram describes ratios of different colors to an entire image) of the image area selected by the user may be extracted; a color of a largest ratio, multiple preset colors whose ratios are in descending order, or a color of a ratio greater than a preset ratio in the color histogram is determined; a pixel value of the determined color is used as the color characteristic information of the image area. A color name of the color may be further determined according to the pixel value of the color, and the color name is used as the color characteristic information of the image area. When multiple colors in the color histogram are determined, the multiple colors may be further displayed for the user to select, and color characteristic information, for example, a pixel value or a color name, of a color selected by the user is determined.

Accordingly, the target object represented by the name of the target object may be searched for according to the extracted color characteristic information. For example, searching is performed according to the color name or the pixel value.

For another example, if the characteristic category is a shape, shape characteristic information of the image area selected by the user is extracted. The shape may be a regular shape, for example, a rectangle, a rhombus, a circle, or an oval, and a shape name may be used as the shape characteristic information. The shape may also be irregular, for example, a graph of a profile of a substance in the image area selected by the user is extracted, and the graph of the profile is used as the shape characteristic information.

Accordingly, the target object represented by the name of the target object may be searched for according to the extracted shape characteristic information. For example, searching is performed according to the shape name or the graph.

For another example, if the characteristic category is a brand, a brand identity in the image area selected by the user is extracted and used as brand characteristic information, where the brand identity may be a brand name or a brand logo.

Accordingly, the target object represented by the name of the target object may be searched for according to the extracted brand characteristic information. For example, searching is performed according to the brand name or the brand logo.

For another example, if the characteristic category is a price, number information in the image area selected by the user is extracted, and the number information is used as price characteristic information.

Accordingly, searching may be performed according to the extracted price characteristic information.

For another example, if the characteristic category is an image, the image area itself selected by the user may be used as image characteristic information.

Accordingly, the target object represented by the name of the target object may be searched for in a manner of image search according to the image area selected by the user.

The foregoing object search methods shown in FIG. 1 and FIG. 2 may be combined. That is, searching for the target object may be searching a locally stored object set, or may be searching on the Internet.

Searching may be performed by the terminal, or may be performed by the server, for example, a cloud server. When searching is performed by the server, the characteristic category and the name of the target object that are input by the user and the image area selected by the user may be sent to the server by the terminal, or corresponding steps may be executed by the terminal and the server together.

Alternatively, the terminal may determine, according to different characteristic categories, whether corresponding steps are executed by the terminal or the server. For example, for some characteristic categories, after extracting characteristic information of the characteristic categories from the image area selected by the user, the terminal may send the extracted characteristic information and the name of the target object to the server; and then the server searches, according to the received characteristic information, for the target object represented by the name of the target object, to obtain a search result, and returns the search result to the terminal.

An embodiment in the following is used to describe in detail the methods provided in the present disclosure with reference to the accompanying drawings.

Figure 3:
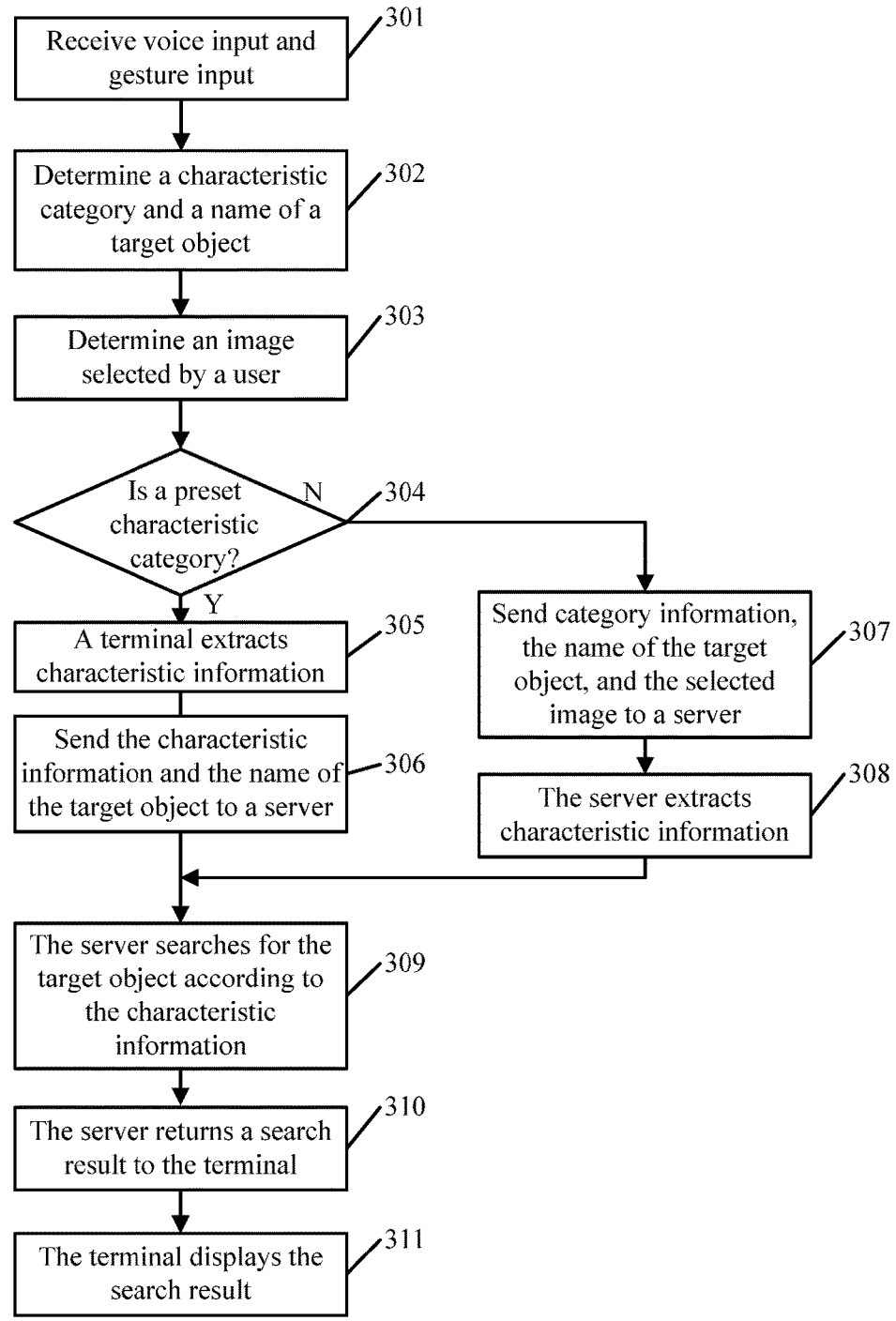
FIG. 3 is Flowchart 3 of an object search method according to an embodiment of the present disclosure.

FIG. 3 is a detailed flowchart of an object search method according to an embodiment of the present disclosure, where the method includes the following steps.

Step 301. Receive voice input and gesture input that are of a user.

In this step, voice input and gesture input that are performed simultaneously by the user may be received.

Alternatively, voice input of the user may be received, and when it is determined that no gesture input is performed by the user and no image area is selected, the user is instructed to perform an operation of selecting an image area, and gesture input of the user is received.

Alternatively, gesture input of the user may be received, and when it is determined that no voice input is performed by the user, the user is instructed to perform a voice input operation, and voice input of the user is received.

Step 302. A terminal determines, according to the voice input of the user, a name of a target object for which the user expects to search and a characteristic category of the target object.

In this step, the characteristic category and the name of the target object may be determined by performing semantic analysis on voice information input by the user.

In this embodiment of the present disclosure, the characteristic category that can be input by the user may be flexibly set according to a characteristic of the target object and an application scenario of this solution. For example, when an article is searched for, the characteristic category may include a color, a shape, a price, a brand, an image, and the like, and the input name of the target object may be an article name of the article expected to be searched for.

Step 303. The terminal acquires an image area selected by the user by means of the gesture input.

In this step, the terminal may acquire an image area selected by the user from a designated image and use the image area as the image area selected by the user, or may acquire a current image obtained by photographing by the user and use the image as the image area selected by the user.

There is no strict order between the foregoing step 302 and step 303.

Step 304. The terminal determines whether the characteristic category input by the user is a preset characteristic category. If the characteristic category input by the user is the preset characteristic category, go to step 305, and if the characteristic category input by the user is not the preset characteristic category, go to step 307.

In this embodiment of the present disclosure, for the characteristic category input by the user, a characteristic of the characteristic category of the image area selected by the user may be extracted by the terminal, or may be extracted by a server. Alternatively, some characteristic categories may be extracted by the terminal, and some other characteristic categories may be extracted by the server. Therefore, a characteristic category whose characteristic information is extracted by the terminal may be set as the preset characteristic category, and the foregoing determining is performed in this step.

For example, the color in the foregoing color, shape, price, brand, and image is used as the preset characteristic category.

Step 305. When the characteristic category input by the user is the preset characteristic category, the terminal extracts characteristic information of the characteristic category from the image area selected by the user.

For example, for a color, color characteristic information of the image area selected by the user is extracted. For details, reference may be made to the foregoing description.

Step 306. The terminal sends, to a server, the extracted characteristic information of the characteristic category and the name, input by the user, of the target object.

Step 307. The terminal sends, to the server, category information of the characteristic category input by the user, the name of the target object, and the image area selected by the user.

Step 308. After receiving the category information, the name of the target object, and the image area, the server extracts, from the image area, the characteristic information of the characteristic category represented by the category information.

For example, for details about corresponding characteristic information that is of the image area selected by the user and extracted from a color, a price, and a brand, reference may be made to the foregoing description.

In addition, further, when the characteristic category is an image, the received image area may be directly used as image characteristic information.

Step 309. After receiving the characteristic information that is of the characteristic category and sent by the terminal, or after extracting the characteristic information of the characteristic category represented by the category information, the server searches, according to the extracted characteristic information, for the target object represented by the name of the target object, to obtain a search result.

The search result is a target object that has the characteristic information of the characteristic category.

Step 310. The server returns the search result to the terminal.

Step 311. After receiving the search result returned by the server, the terminal displays the search result to the user.

Using the foregoing object search method provided in this embodiment of the present disclosure, when performing searching, a user only needs to perform voice input and gesture input, and only needs to input a characteristic category and a name of a target object, and select an image area, and then a corresponding search criterion can be determined by a terminal or a server, and the target object can be searched for according to the search criterion without requiring the user to clearly describe the search criterion. In this way, a more flexible search manner is provided for the user, and a restriction on an application scenario is reduced during searching.

For example, when the user notices a very beautiful color in an image and wants to search for a wallet of this color, it is very likely that a clear color name cannot be provided because the color is very special. In this case, searching can be performed using the foregoing method provided in this embodiment of the present disclosure.

For another example, when the user wants to search for shoes of a particular brand, but does not know a name of the brand, and has only an image including a brand logo of the brand, the foregoing method provided in this embodiment of the present disclosure can be used to select an image area including the brand logo from the image, and the image area is used as a selected image to perform searching.

Figure 4:
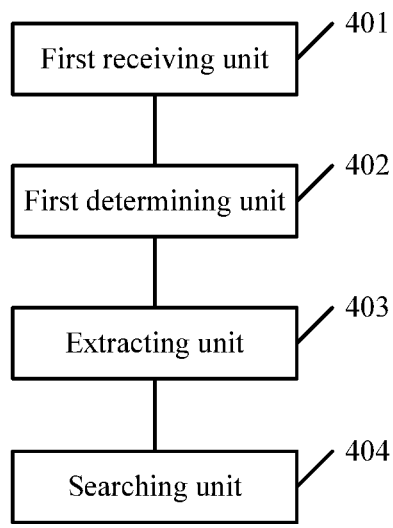
FIG. 4 is Schematic Structural Diagram 1 of an object search apparatus according to an embodiment of the present disclosure.

Based on a same concept and according to the object search methods provided in the foregoing embodiments of the present disclosure, accordingly, this embodiment of the present disclosure further provides an object search apparatus, whose schematic structural diagram is shown in FIG. 4. The apparatus includes a first receiving unit 401 configured to receive voice input and gesture input that are of a user; a first determining unit 402 configured to determine, according to the voice input, a name of a target object for which the user expects to search and a characteristic category of the target object; an extracting unit 403 configured to extract characteristic information of the characteristic category from an image area selected by the user by means of the gesture input; and a first searching unit 404 configured to search for the target object according to the extracted characteristic information and the name of the target object.

Further, the first searching unit 404 is configured to send the characteristic information and the name of the target object to a server, and receive a search result returned by the server, where the search result is obtained by the server by searching, according to the characteristic information, for the target object represented by the name of the target object.

Further, the first receiving unit 401 is configured to receive voice input and gesture input that are performed simultaneously by the user; or receive voice input of the user, and when it is determined that no gesture input is performed by the user and no image area is selected, instruct the user to perform an operation of selecting an image area, and receive gesture input of the user; or receive gesture input of the user, and when it is determined that no voice input is performed by the user, instruct the user to perform a voice input operation, and receive voice input of the user.

Further, the first determining unit 402 is further configured to acquire an image area selected from a designated image by the user by means of the gesture input and use the image area as the image area selected by the user; or acquire an image that is obtained by photographing by the user by means of the gesture input and use the image area as the image area selected by the user.

The functions of the units in the foregoing FIG. 4 may correspond to corresponding processing steps of the procedure shown in FIG. 1 or FIG. 3, and details are not described herein again.

Figure 5:
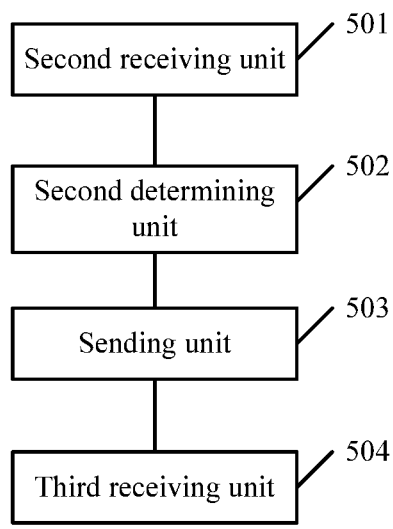
FIG. 5 is Schematic Structural Diagram 2 of an object search apparatus according to an embodiment of the present disclosure.

Based on a same concept and according to the object search methods provided in the foregoing embodiments of the present disclosure, accordingly, this embodiment of the present disclosure further provides an object search apparatus, whose schematic structural diagram is shown in FIG. 5. The apparatus includes a second receiving unit 501 configured to receive voice input and gesture input that are of a user; a second determining unit 502 configured to determine, according to the voice input, a name of a target object for which the user expects to search and a characteristic category of the target object; a sending unit 503 configured to send, to a server, category information of the characteristic category, the name of the target object, and an image area that is selected by the user by means of the gesture input; and a third receiving unit 504 configured to receive a search result returned by the server, where the search result is obtained by the server by searching for the target object represented by the name of the target object, where a characteristic of the characteristic category that is of the image area and represented by the category information is used as a search criterion.

Further, the second receiving unit 501 is configured to receive voice input and gesture input that are performed simultaneously by the user; or receive voice input of the user, and when it is determined that no gesture input is performed by the user and no image area is selected, instruct the user to perform an operation of selecting an image area, and receive gesture input of the user; or receive gesture input of the user, and when it is determined that no voice input is performed by the user, instruct the user to perform a voice input operation, and receive voice input of the user.

Further, the second determining unit 502 is further configured to acquire an image area selected from a designated image by the user by means of the gesture input and use the image area as the image area selected by the user; or acquire an image that is obtained by photographing by the user by means of the gesture input and use the image area as the image area selected by the user.

The functions of the units in the foregoing FIG. 5 may correspond to corresponding processing steps of the procedure shown in FIG. 2 or FIG. 3, and details are not described herein again.

In conclusion, the solutions provided in the embodiments of the present disclosure include receiving voice input and gesture input that are of a user; determining, according to the voice input, a name of a target object for which the user expects to search and a characteristic category of the target object; extracting characteristic information of the characteristic category from an image area selected by the user by means of the gesture input; and searching for the target object according to the extracted characteristic information and the name of the target object. The solutions provided in the embodiments of the present disclosure can provide a user with a more flexible search manner, and reduce restriction on an application scenario during searching.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

The invention claimed is:

1. An object search method implemented by a terminal communicatively coupled to a server, the method comprising:

receiving, by the terminal, voice input and gesture input from a user;

determining, by the terminal, a name of a target object for which the user expects to search and a characteristic category of the target object according to the voice input;

determining, by the terminal, whether the name of the target object and the characteristic category of the target object correspond to a preset category;

extracting, by the terminal, extracted characteristic information locally on the terminal according to the name of the target object, the characteristic category of the target object, and an image corresponding to the gesture input and sending the extracted characteristic information and the name of the target object to the server when the name of the target object and the characteristic category of the target object correspond to the preset category;

sending, by the terminal, the name of the target object, the characteristic category of the target object, and the image corresponding to the gesture input to the server to enable the server to extract the extracted characteristic information when the name of the target object and the characteristic category of the target object do not correspond to the preset category;

receiving, by the terminal, a search result from the server that corresponds to the extracted characteristic information and the image corresponding to the gesture input; and displaying, by the terminal, the search result.

2. The method of claim 1, wherein receiving the voice input and the gesture input from the user comprises receiving the voice input and the gesture input that are received simultaneously from the user.

3. The method of claim 1, further comprising acquiring an image area from the gesture input of the user by:
acquiring the image area that is selected from a designated image corresponding to the gesture input; and
using the image area as the image from the user.

4. The method of claim 1, wherein receiving the voice input and the gesture input from the user comprises at least one of:
receiving the voice input and the gesture input that are received simultaneously from the user;
receiving the voice input from the user, and when no gesture input is performed by the user and no image area is selected, instructing the user to perform an operation of selecting an image area, and receiving the gesture input from the user; or
receiving the gesture input from the user, and when no voice input is performed by the user, instructing the user to perform a voice input operation, and receiving the voice input from the user.

5. The method of claim 1, wherein receiving the voice input and the gesture input from the user comprises receiving the voice input of the user, and when no gesture input is performed by the user and no image area is selected, instructing the user to perform an operation of selecting an image area, and receiving the gesture input from the user.

6. The method of claim 1, wherein receiving the voice input and the gesture input from the user comprises receiving the gesture input of the user, and when no voice input is performed by the user, instructing the user to perform a voice input operation, and receiving the voice input from the user.

7. The method of claim 1, further comprising acquiring an image area selected by the user as the gesture input, and acquiring the image area comprises at least one of:
acquiring an image area that is selected from a designated image by the user as the gesture input, and using the image area as the image area selected by the user; or
acquiring an image that is obtained by photographing from the user as the gesture input, and using the obtained image as the image area selected by the user.

8. The method of claim 1, further comprising acquiring an image area selected by the user as the gesture input, and acquiring the image area comprises:
acquiring an image that is obtained by photographing from the user as the gesture input; and
using the obtained image as the image area selected by the user.

9. The method of claim 1, wherein the gesture input from the user comprises a graph of a profile of an irregular shape input by the user.

10. The method of claim 1, wherein the gesture input from the user comprises a brand logo in a photograph taken by the user.

11. The method of claim 1, wherein the gesture input from the user comprises a pixel value selected by the user from a color histogram displayed on the terminal.

12. A terminal communicatively coupled to a server, comprising:
a receiver configured to receive voice input and gesture input from a user;
a processor coupled to the receiver and configured to:
determine, according to the voice input, a name of a target object for which the user expects to search and a characteristic category of the target object;
determine whether the name of the target object and the characteristic category of the target object correspond to a preset category;
extract extracted characteristic information locally on the terminal according to the name of the target object, the characteristic category of the target object, and an image corresponding to the gesture input and send the extracted characteristic information and the name of the target object to the server when the name of the target object and the characteristic category of the target object correspond to the preset category;
send the name of the target object, the characteristic category of the target object, and the image corresponding to the gesture input to the server to enable the server to extract the extracted characteristic information when the name of the target object and the characteristic category of the target object do not correspond to the preset category;
receive a search result from the server that corresponds to the extracted characteristic information and the image corresponding to the gesture input; and
display the search result.

13. The terminal of claim 12, wherein the receiver is further configured to perform at least one of:
receive the voice input and the gesture input that are received simultaneously from the user;
receive the voice input from the user, and when no gesture input is received from the user and no image area is selected, instruct the user to perform an operation of selecting an image area, and receive the gesture input from the user; or
receive the gesture input from the user, and when no voice input is received from the user, instruct the user to perform a voice input operation, and receive the voice input from the user.

14. The terminal of claim 12, wherein the processor is further configured to perform at least one of:
acquire an image area that is selected from a designated image corresponding to the gesture input, and use the image area as the image from the user; or
acquire an image that is obtained by photographing from the user as the gesture input, and use the obtained image as the image from the user.

15. An object search method implemented by a terminal communicatively coupled to a server, the method comprising:
receiving, by the terminal, voice input and gesture input from a user;
determining, by the terminal, a name of a target object for which the user expects to search and a characteristic category of the target object according to the voice input;
determining, by the terminal, whether the name of the target object and the characteristic category of the target object correspond to a preset category;
extracting, by the terminal, extracted characteristic information locally on the terminal according to the name of the target object, the characteristic category of the target object, and an image corresponding to the gesture input and sending the extracted characteristic information and the name of the target object to the server when the name of the target object and the characteristic category of the target object correspond to the preset category;

sending, by the terminal, the name of the target object, the characteristic category of the target object, and an image area that corresponds to the gesture input to the server to enable the server to extract the extracted characteristic information when the name of the target object and the characteristic category of the target object do not correspond to the preset category; and receiving, by the terminal, a search result from the server, the search result being obtained by the server by searching for the target object represented by the name of the target object, and a characteristic of the characteristic category that is of the image area and represented by the category information is used as a search criterion.

16. The method of claim 15, wherein receiving the voice input and the gesture input from the user comprises at least one of:

receiving the voice input and the gesture input that are received-simultaneously from the user;

receiving the voice input of the user, and when no gesture input is received from the user and no image area is selected, instructing the user to perform an operation of selecting an image area, and receiving the gesture input from the user; or receiving the gesture input from the user, and when no voice input is received from the user, instructing the user to perform a voice input operation, and receiving the voice input from the user.

17. The method of claim 15, further comprising acquiring an image area selected by the user corresponding to the gesture input by:

acquiring the image area that is selected from a designated image by the user corresponding to the gesture input, and using the image area as the image area selected by the user; or acquiring an image that is obtained by photographing from the user as the gesture input, and using the obtained image as the image area selected by the user.

18. A terminal communicatively coupled to a server, comprising:

a receiver configured to receive voice input and gesture input from a user;

a processor coupled to the receiver and configured to:

determine, according to the voice input, a name of a target object for which the user expects to search and a characteristic category of the target object;

determine whether the name of the target object and the characteristic category of the target object correspond to a preset category;

extract extracted characteristic information locally on the terminal according to the name of the target object, the characteristic category of the target object, and an image corresponding to the gesture input and send the extracted characteristic information and the name of the target object to the server when the name of the target object and the characteristic category of the target object correspond to the preset category;

send, to the server, the name of the target object, the characteristic category of the target object, and an image area that corresponds to the gesture input to enable the server to extract the extracted characteristic information when the name of the target object and the characteristic category of the target object do not correspond to the preset category; and receive a search result from the server, the search result being obtained by the server by searching for the target object represented by the name of the target object, and a characteristic of the characteristic category that is of the image area and represented by the category information is used as a search criterion.

19. The terminal of claim 18, wherein the receiver is further configured to perform at least one of:

receive the voice input and the gesture input that are received simultaneously from the user;

receive the voice input from the user, and when no gesture input is performed by the user and no image area is selected, instruct the user to perform an operation of selecting an image area, and receive the gesture input from the user; or receive the gesture input from the user, and when no voice input is performed by the user, instruct the user to perform a voice input operation, and receive the voice input from the user.

20. The terminal of claim 18, wherein the processor is further configured to:

acquire an image area that is selected from a designated image by the user corresponding to the gesture input, and use the image area as the image area selected by the user; or acquire an image that is obtained from photographing by the user as the gesture input, and use the obtained image as the image area selected by the user.

* * * * *